United States Patent [19]

Leverett et al.

[11] Patent Number: 4,543,032
[45] Date of Patent: Sep. 24, 1985

[54] ROBOT MANIPULATOR WITH AUTOMATICALLY CHANGEABLE FINGER TOOLS

[75] Inventors: Theodore W. Leverett; Bela Musits, both of Concord, N.C.

[73] Assignee: International Business Machines Corporation, Armonk, N.Y.

[21] Appl. No.: 471,569

[22] Filed: Mar. 2, 1983

[51] Int. Cl.⁴ .............................................. B25J 15/04
[52] U.S. Cl. ....................................... 414/730; 901/31
[58] Field of Search ........................... 294/DIG. 2, 28; 414/730, 729, 744, 749; 901/31, 39, 41

[56] References Cited

U.S. PATENT DOCUMENTS

| | | | |
|---|---|---|---|
| 2,384,408 | 9/1945 | Warren | 294/28 |
| 3,451,224 | 6/1969 | Colechia et al. | 901/8 X |
| 3,916,701 | 11/1975 | Butler | 901/18 X |
| 4,042,122 | 8/1977 | Espy et al. | 414/783 X |
| 4,132,318 | 1/1979 | Wang et al. | 901/34 X |
| 4,165,116 | 8/1979 | Baudoin et al. | 901/39 X |
| 4,275,986 | 6/1981 | Engelberger et al. | 414/730 |
| 4,448,405 | 5/1984 | Cipolla | 294/DIG. 2 X |

Primary Examiner—Terrance L. Siemens
Attorney, Agent, or Firm—E. Ronald Coffman

[57] ABSTRACT

Changeable finger tools for the gripper of an object manipulator are held in place by a self-releasing detent supplemented by frictional forces produced by the gripper. The retention technique enables fast, efficient automatic changing of the finger tools.

10 Claims, 4 Drawing Figures

ROBOT MANIPULATOR WITH AUTOMATICALLY CHANGEABLE FINGER TOOLS

FIELD OF THE INVENTION

This invention relates to object manipulators such as those used in robots or other automatic equipment to handle work pieces or tools under program or remote control. This invention relates particularly to the gripping portion of an object manipulator.

BACKGROUND OF THE INVENTION

The gripper of an object manipulator serves as a general purpose handling facility for tasks such as lifting, transporting, orienting and holding work pieces or tools which in turn performs special operations on work pieces. To achieve the versatility required, the object engaging surfaces or fingers of the gripper cannot be too specialized. It has been known to provide specialized work surfaces which are semi-permanently mounted in place, as by screws, to do a particular repetitive job not requiring maximum versatility. Otherwise, tasks requiring specialized handling are accomplished by using the general purpose gripper to hold a specialized tool. Examples of such tools are vacuum pickup devices for delicate or small objects or specially configured jaw assemblies for grasping objects having a curved or irregular surface. When a gripper uses such a tool to engage an object, much of the ability of the gripper control system to sense the object through sensing devices in its fingers is eliminated or at least compromised. An object of out invention thus is to provide tools for the fingers of an object manipulator which act as part of the manipulator fingers to maintain object sensitivity and yet are easily changed by the manipulator itself to permit specialization without compromising versatility.

Another object of our invention has been to provide interchangeable finger tools which are attached and removed by a simple sliding action, and which do not require separate manipulation of any form of latch.

SUMMARY OF THE INVENTION

In accordance with our invention, the fingers of a gripper are provided with tool pedestals or track-forming members, onto which substantially complementary finger tools may be slid. A self-releasing, two-directional-acting, force-limited detent is provided to retain the finger tools in their installed position. This detent is engaged and disengaged by the sliding motion of the finger tools onto and off of the pedestal. The track configuration itself secures the finger tools in all directions of motion with respect to the finger pedestal except the direction of installation and removal. The detent normally retains the finger tools on the pedestal against the forces of gravity or acceleration during maneuvers imposing no particular load tending to strip the finger tools from the pedestals. Where a load is imposed upon the finger tools that would tend to strip them from the pedestals, such as when an object is to be lifted, the holding force of the detent is supplemented by friction force between the finger tool and the pedestal, generated by the gripper itself under program control. Thus, the ability of the controlled robot to apply a programmed gripping force is employed in our invention to make it possible to use a very simple, self-operating detent as a latch.

In a robot of the type marketed by International Business Machines Corporation under the name 7565 Manufacturing System, the nominal available gripping force is three times that of the nominal available lifting force. This ratio is generally adequate to assure that a sufficient frictional force can be developed as required, to maintain the finger tools in position on the finger pedestals. U.S. Pat. No. 4,132,318 discloses a computer-controlled robot, having a manipulator that is capable of picking up objects with a controlled gripping force.

The preferred embodiment of our invention employs a spring-loaded ball as the detent so as to provide, in addition to a nominal holding force, a locating action to prevent gradual displacement of the finger tools with respect to the finger pedestals. Finger tools, constructed in accordance with our invention, act not only to grip and lift, but also can spread, push, or take substantially all of the actions that could be accomplished with the gripper fingers themselves. Such actions include making use of the independent multi-directional force sensing feedback capabilities of the gripper.

These and other objects, features and advantages of our invention will be apparent to those skilled in the art from the following description of a preferred embodiment of our invention, wherein reference is made to the accompanying drawings, of which:

FIG. 1 is a simplified perspective view of a robot, including a gripper with which our invention may be used.

Figure 4:
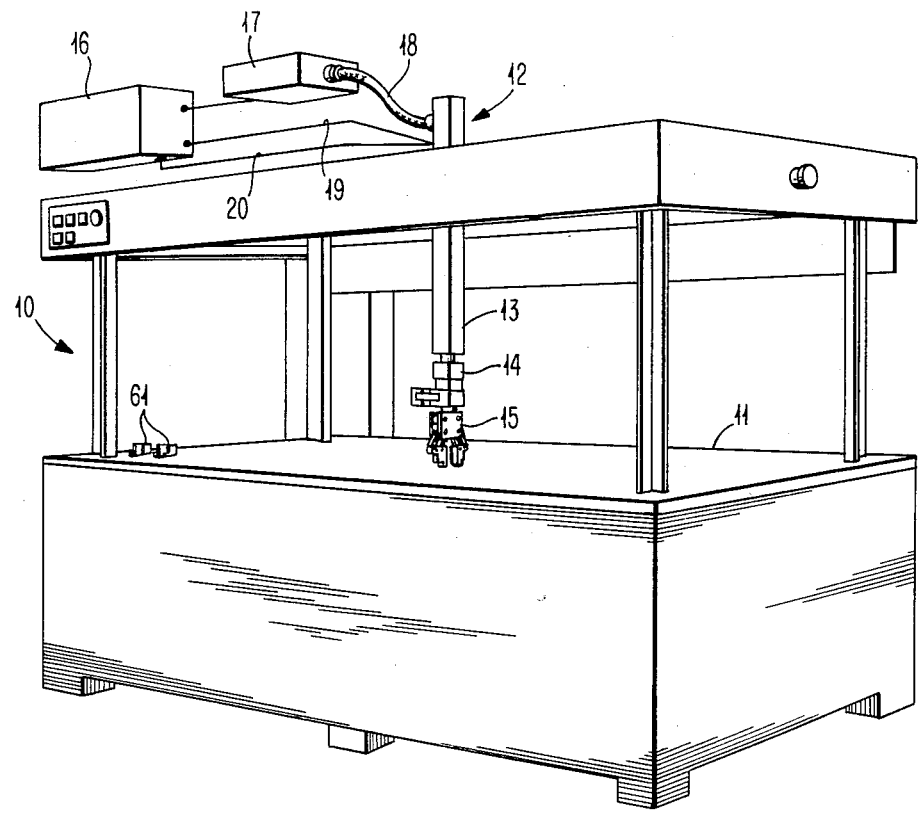
FIG. 4 is a fragmentary perspective view of a finger tool holder which facilitates the automatic installation and removal of the finger tools from the gripper of FIG. 3.

Robot or object manipulator 10, as shown in FIG. 1, is of the type marketed by International Business Machines Corporation under the name of 7565 Manufacturing System. Except for the gripper details as hereinafter described, the remainder of the robot, including its control system, is otherwise known to those skilled in the art.

Robot 10 comprises a table 11 having an overhead carriage assembly 12 which supports an arm 13 for X,Y and Z movements throughout the space over table 11.

Arm 13 carries articulated wrist mechanism 14 and a gripper 15 by which work objects and tools can be manipulated. The arm 13 and wrist mechanism 14 enable gripper 15 to be moved and oriented as required, to perform a variety of tasks.

Control of gripper 15 is accomplished through use of a computer 16 which controls a hydraulic power source 17, connected through hydraulic line 18 to the various operating units on the arm 13. Electrical signals for controlling motors to operate the overhead carriage assembly 12 is delivered through electrical line 19 from control computer 16. Feedback from various sensors within the gripper 15 and elsewhere in the robot 10, is delivered to the computer 16 through cable 20.

Figure 2:
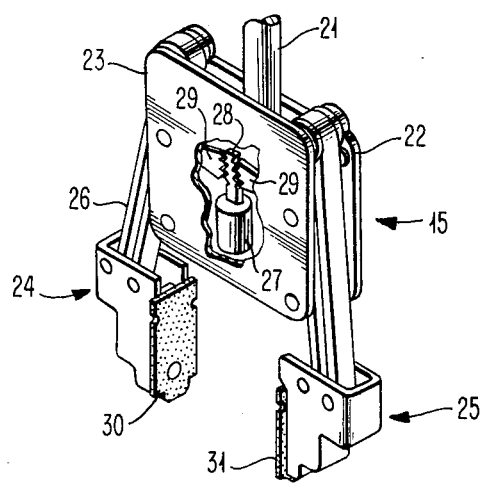
FIG. 2 is an enlarged perspective view of a gripper of the type used in the robot of FIG. 1, but which has been modified in accordance with our invention to receive interchangeable finger tools.

The details of the gripper 15 are better shown in FIG. 2. The gripper 15 is supported by shaft 21 from the wrist mechanism 14 of FIG. 1 and includes a frame structure provided by plates 22 and 23, and a pair of opposed fingers 24 and 25, each of which is suspended from the frame by a pair of articulated parallel links 26. The links 26 are mounted in such a way as to enable the fingers 24 and 25 to remain parallel while moving relative to one another.

The links 26 are operated or controlled by a hydraulic motor 27, mounted within the frame, which displaces a rack 28 to drive a pair of sector gears 29 connected to the links 26. Hydraulic motor 27, of course, is controlled by computer 16 through hydraulic power source 17. The fingers 24 and 25 thus are operable to grasp objects by controlled mutual force developed therebetween.

Figure 3:
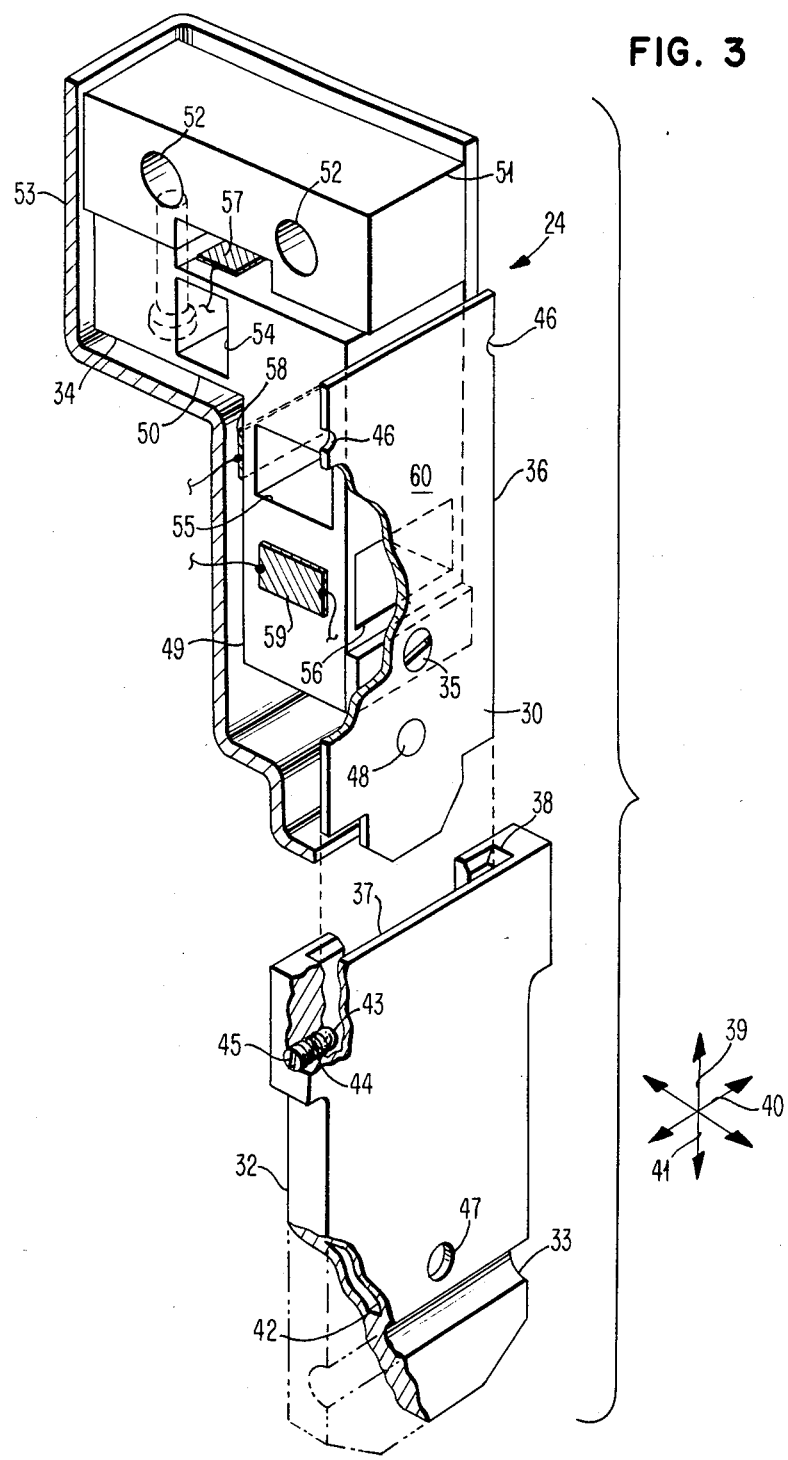
FIG. 3 is an enlarged perspective exploded view of a finger of the gripper as shown in FIG. 2, together with a finger tool constructed in accordance with our invention.
Figure 4:
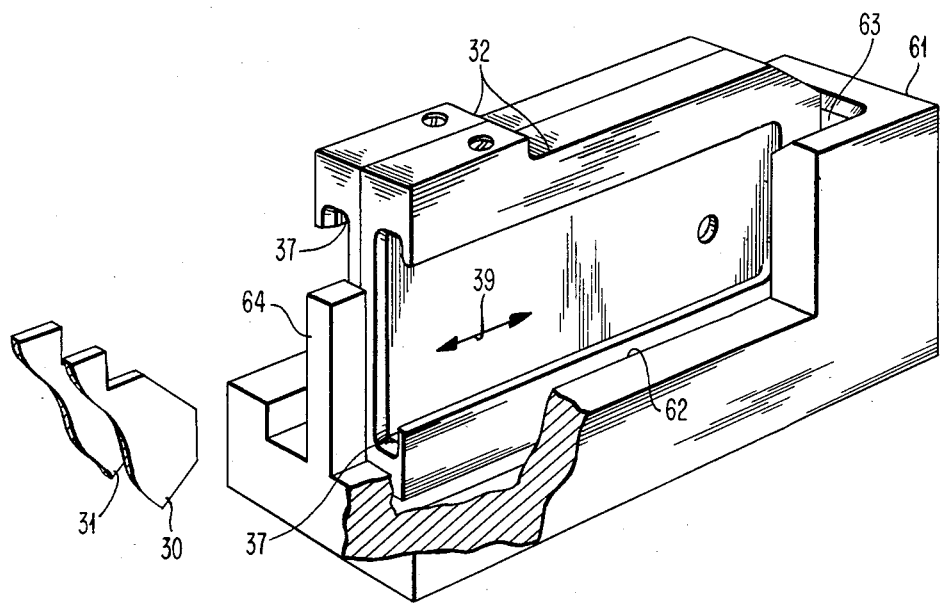

The fingers 24 and 25 each have a rectangular plate or finger pedestal 30 or 31 for receiving the changeable finger tools of our invention as is shown in FIG. 3.

A finger tool 32 shown in FIG. 3 is configured for the lifting of a cylindrical object by means of groove 33, as an example. The finger pedestal 30 is secured to a flexure arm 34 by key means (not shown) and by screw 35, so as to present a substantially unencumbered peripheral edge 36. Finger tool 32 comprises slot 37, sized to match the peripheral edge 36 of pedestal 30 so as to form a track therebetween. Slot 37 includes a chamfered or angled lead portion 38 at its upper end to facilitate the insertion of pedestal 30. The track formed by edge 36 and slot 37 permits the tool 32 to slide on pedestal 30 along axis 39 while resisting relative movement along axes 40 and 41, thereby assuring that the finger tool 32 will move in all directions, along with the pedestal 30. The slot 37 has a bottom surface or limit stop 42, shown in the broken-away portion of finger tool 32, which engages the lower edge of pedestal 30 to enable force to be transmitted along axis 39 of the finger tool 32, as for accomplishing pushing motions.

While the preferred embodiment of our invention provides the track by a slot formed in the tool for cooperating with edge 36 of the pedestal, the track can be implemented in other ways. For example, the slot and edge can be reversed. It is important that the track arrangement be such that gripping force on the tool 32 will cause frictional engagement with a mating portion of pedestal 30.

Near the upper end of slot 37, there is provided a detent ball 43, retained in a socket or bore, and containing a spring 44 and plug 45. A similar ball is provided, but is not visible, in the opposite edge of slot 37. Detent balls 43 cooperate with detent recesses 46 near the upper edge of pedestal 30 to retain the finger tool 32 in place on the pedestal and to locate the finger tool precisely with respect to the pedestal. Precise positioning is required, for example, to ensure that an opening such as 47 aligns with a photo transistor 48 carried by the pedestal 30 or a light source on the pedestal of the opposite finger 25 to provide for optical vision between the fingers 24 and 25. The curved surface of the ball 43 serves both to locate the tool 32 precisely on the pedestal 30 and to provide bi-directional camming surfaces to permit engagement and release of the tool 32 by simple sliding movement.

The arm 34 comprises a downwardly extending leg 49 to which pedestal 30 is mounted, and a horizontal leg 50 that is attached at its upper and outward end to a bearing block 51, to which the parallel links 26 pivotally attach through pivot bores 52. A casing or shroud 53 covers the details of arm 34 in use. This shroud has been broken away to show the inclusion of cut-out portions 54, 55 and 56 which provide thin sections of the arm 34, on which are mounted strain gauges 57, 58 and 59. These strain gauges deform in response to multi-axial forces applied to pedestal 30 to sense the interaction of the pedestal with other objects and develop feedback signals to be sent back on cable 20 to computer 16.

In operation, the finger tool 32, when installed, operates along with pedestal 30 in the same manner as if the finger tool had been positively affixed thereto. Since the ball detent 43 is capable of sustaining only limited force in the direction of axis 39, hydraulic motor 27 is controlled by computer 16 to apply a sufficient gripping force between the fingers 24 and 25 to develop frictional engagement of the inner surface of finger tool 32 with the mating surface 60 of the pedestal 30 to resist any slippage of the finger tool 32 from the pedestal. These mating surfaces can be finished as desired to enhance such frictional holding force, however we have found a normal machine finish to be adequate for many tasks.

To securely resist undesired separation of finger tool 32, the force between pedestals 30 should be in the order of two to three times the weight of the object being manipulated. The robots commercially offered, as mentioned above, are arranged to nominally provide a gripping force that is three times the lifting force capability.

FIG. 4 shows a finger tool holder 61 for enabling the automatic installation and removal of finger tools 32 from the pedestals 30 and 31. Two such tool holders 61 are shown in FIG. 1 as would be used by a robot requiring two sets of finger tools to perform its assigned tasks. Holder 61 includes an edge or rim 62 which provides an upwardly, open recess 63 that surrounds the lower edges of finger tools 32 while exposing the entire slot 37 at the left side. Rim 62 prevents finger tools 32 from moving horizontally in FIG. 4 along axis 33 while the tools 32 are free to move vertically into and out of recess 63. When finger tools 32 are to be installed on pedestals 30 and 31, the pedestals are presented by gripper 15 in a horizontal orientation, as shown, and are simply slid into respective slots 37. Pedestals 30 and 31 then are moved vertically by gripper 15 with the finger tools 32 installed. When it is desired to remove the finger tools 32, the motion is just reversed. Thus, the gripper 15 is moved to bring the finger tools 32 in a horizontal orientation, downwardly into recess 63. Pedestals 30 and 31 then are retracted by horizontal motion and, since recess 63 holds the finger tools 32 against horizontal motion, the finger tools 32 are stripped from the pedestals 30 and 31. A post 64 is provided to prevent canting or rotation of the finger tools 32 as they are being stripped from the pedestals 30 and 31.

We claim:

1. An object manipulator, comprising a gripper having at least two relatively movable fingers mounted in opposition for mutual force engagement and control means for controlling the movement of said fingers, wherein the improvement comprises:

at least one of said fingers having a pedestal for receiving a tool, said pedestal and tool comprising track means therebetween for permitting relating movement therebetween along a first axis of said finger, the track means positively resisting relative movement therebetween along two axes normal to said first axis, spring-biased detent means provided on said pedestal and the tool for yieldably retaining the tool against displacement along said first axis only in the absence of substantial loading along said first axis, and said control means comprises means for selectively controlling the mutual force engagement between said fingers to provide a frictional force between said pedestal and the tool for resisting relative movement therebetween along said first axis.

2. An object manipulator, as defined in claim 1, wherein said detent means comprises bi-directional camming surfaces for yieldably resisting installation of the tool onto and removal of the tool from said pedestal.

3. An object manipulator, as defined in claim 1, wherein said detent means comprises cooperative camming surfaces for locating the tool on said pedestal in a predetermined position along said first axis.

4. An object manipulator, as defined in claim 1, wherein said detent means comprises a spring-loaded ball carried by one of said pedestal and the tool, and a recess for receiving said ball carried by the other of said pedestal and the tool.

5. An object manipulator, as defined in claim 1, wherein said control means includes feedback means responsive to said mutual force.

6. An object manipulator, as defined in claim 1, wherein each of said fingers has a pedestal for receiving tools.

7. An object manipulator, as defined in claim 1, wherein said track means includes a limit stop for positively resisting movement of the tool in one direction along said first axis.

8. An object manipulator, as defined in claim 1, further comprising arm means for supporting said gripper, and including articulated wrist means by which said gripper is orientable about a plurality of axes.

9. An object manipulator, as defined in claim 1, and further comprising an arm for supporting said gripper for multi-directional movement and wherein the improvement further comprises at least one tool holder, mounted within the range of movement within said gripper, and including an open recess for holding a tool in a substantially fixed position, the tool being restrained against movement along said first axis by edges of said recess while being removable from said recess by movement normal to said first axis, and said control means further comprising means for moving said arm to move said pedestal sequentially along said first axis to insert said pedestal into the tool, and then to move said pedestal along said second axis to remove the tool from said recess, and further, for moving said pedestal along said second axis to deposit the tool in said recess, and subsequently to move said pedestal along said first axis to remove the tool from said pedestal.

10. An object manipulator, as defined in claim 9, wherein at least two separate tool holders are provided, each for receiving different tools.

* * * * *